United States Patent
Hsueh

(10) Patent No.: US 9,987,970 B2
(45) Date of Patent: Jun. 5, 2018

(54) HEADLIGHT SOCKET WITH ANTENNA

(71) Applicant: YI CHANG HSIANG INDUSTRIAL CO., LTD., Taoyuan (TW)

(72) Inventor: Chih-Yuan Hsueh, Taoyuan (TW)

(73) Assignee: YI CHANG HSIANG INDUSTRIAL CO., LTD. (TW)

( * ) Notice: Subject to any disclaimer, the term of this patent is extended or adjusted under 35 U.S.C. 154(b) by 106 days.

(21) Appl. No.: 15/139,658

(22) Filed: Apr. 27, 2016

(65) Prior Publication Data

US 2017/0317410 A1 Nov. 2, 2017

(51) Int. Cl.
*H01Q 1/32* (2006.01)
*B60Q 1/00* (2006.01)
*H01Q 21/28* (2006.01)
*H01Q 9/04* (2006.01)
*H01Q 9/42* (2006.01)

(52) U.S. Cl.
CPC ......... *B60Q 1/0017* (2013.01); *H01Q 1/3291* (2013.01); *H01Q 21/28* (2013.01); *H01Q 9/0407* (2013.01); *H01Q 9/42* (2013.01)

(58) Field of Classification Search
CPC ........ H01Q 1/32; H01Q 1/3208; H01Q 1/325; H01Q 1/3283; H01Q 1/3291; H01Q 1/42; H01Q 1/44; H01Q 9/0407; H01Q 9/42; H01Q 21/28
USPC .................................. 343/713, 721, 711, 712
See application file for complete search history.

(56) References Cited

U.S. PATENT DOCUMENTS

| | | | |
|---|---|---|---|
| 6,292,151 B1 * | 9/2001 | Wu .......................... | H01Q 1/06 343/702 |
| 7,546,093 B2 * | 6/2009 | Kim ....................... | H01Q 1/084 343/702 |
| 7,852,271 B2 * | 12/2010 | Grunig ..................... | H01Q 1/24 343/702 |
| 9,755,299 B2 * | 9/2017 | Lee ....................... | H01Q 1/1271 |

* cited by examiner

*Primary Examiner* — Tho G Phan
*Assistant Examiner* — Patrick Holecek
(74) *Attorney, Agent, or Firm* — Schmeiser, Olsen & Watts, LLP

(57) ABSTRACT

A headlight socket with an antenna includes a base, cover, first antenna device and connection stand. The base includes a mounting portion. The cover is mounted on the base through the mounting portion and has a sidewall for annularly defining a receiving space. The first antenna device is received in the cover and includes a conductive end. The connection stand is coupled to the sidewall. The connection stand includes a connection port in contact and connection with the conductive end. The headlight socket is mounted on a vehicle. The first antenna device for receiving signals is disposed at the front of the vehicle, thereby enhancing the quality of signal reception. Conventional vehicular antennas are integrated into the headlight socket to manifest advantages of modularization so that an automobile assembly process is simplified, allowing internal circuits to be readily integrated.

9 Claims, 6 Drawing Sheets

HEADLIGHT SOCKET WITH ANTENNA

FIELD OF THE INVENTION

The present invention relates to headlight sockets and, more particularly, to a headlight socket with an antenna and modularization advantages.

BACKGROUND OF THE INVENTION

Due to technological advancements, additional electronic devices, such as digital televisions (DTV), global positioning systems (GPS), radios, and the like, are increasingly mounted inside a car body, so are the integrated functions thereof. The electronic devices receive and transmit signals by an antenna structure.

Conventional vehicular antenna structures come in the following categories, printed antennas mounted on windows of vehicles, extensible antennas mounted at the rear ends of vehicles, and fixed antennas (such as shark-fin antennas and rod-shaped antennas) mounted on the tops of vehicles.

However, the aforesaid conventional vehicle antenna structures have disadvantages. For example, the printed antennas cannot be easily mounted on the windows of the vehicles, nor are they efficient in receiving signals, because the thermal insulating sheets on the windows using contain metals. Both the extensible antennas and the fixed antennas are mounted on the surfaces of the car bodies and thus may get damaged readily to the detriment of the beauty of the car bodies. Accordingly, there is still room for improving the prior art.

SUMMARY OF THE INVENTION

It is an objective of the present invention to provide a headlight socket which is modularized and efficient in receiving signals while a vehicle mounted with the headlight socket is moving.

In order to achieve the above and other objectives, the present invention provides a headlight socket with an antenna, comprising a base, a cover, a first antenna device, and a connection stand. The base comprises a mounting portion. The cover is mounted on the base through the mounting portion and has a sidewall for annularly defining a receiving space. The first antenna device is received in the cover and includes a conductive end. The connection stand is coupled to the sidewall. The connection stand comprises a connection port in contact and connection with the conductive end.

Regarding the headlight socket, the cover has a cylindrical receiving space, whereas the first antenna device is provided in form of a flexible antenna module or a thin-film antenna module and winding to take on a cylindrical shape and be disposed in the cover.

Regarding the headlight socket, the first antenna device comprises at least an antenna structure. The antenna structure is exemplified by a digital television (DTV) antenna, a global position system (GPS) antenna, and/or a broadcast antenna.

Regarding the headlight socket, a slot is disposed on the sidewall of the cover, whereas the first antenna device is a microstrip antenna module, a rigid antenna module, a ceramic antenna module or a patch antenna module and is inserted into the slot.

The headlight socket further comprises a second antenna device. The second antenna device is disposed on the first antenna device, has a conductive end connectable to a connection port of the connection stand, and is a microstrip antenna module, a rigid antenna module, a ceramic antenna module, or a patch antenna module.

Regarding the headlight socket, the second antenna device comprises at least an antenna structure exemplified by a digital television (DTV) antenna, a global position system (GPS) antenna, and/or a broadcast antenna.

The headlight socket further comprises a second antenna device. The second antenna device is disposed on the first antenna device, has a conductive end connectable to a connection port of the connection stand, and is a microstrip antenna module, a rigid antenna module, a ceramic antenna module or a patch antenna module.

Therefore, according to the embodiments of the present invention, the headlight socket is for use with a vehicle. With the first antenna devices and second antenna device being disposed at the front of the vehicle, signals can best be received from the front of the vehicle while the vehicle is moving, thereby enhancing the quality of signal reception. The headlight socket is advantageously characterized in that conventional vehicular antennas are integrated into a vehicle to manifest the advantages of modularization so that, during an automobile assembly process, an antenna assembly procedure and a headlight assembly procedure are integrated, and in consequence the automobile assembly process is simplified, allowing internal circuits to be readily integrated.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
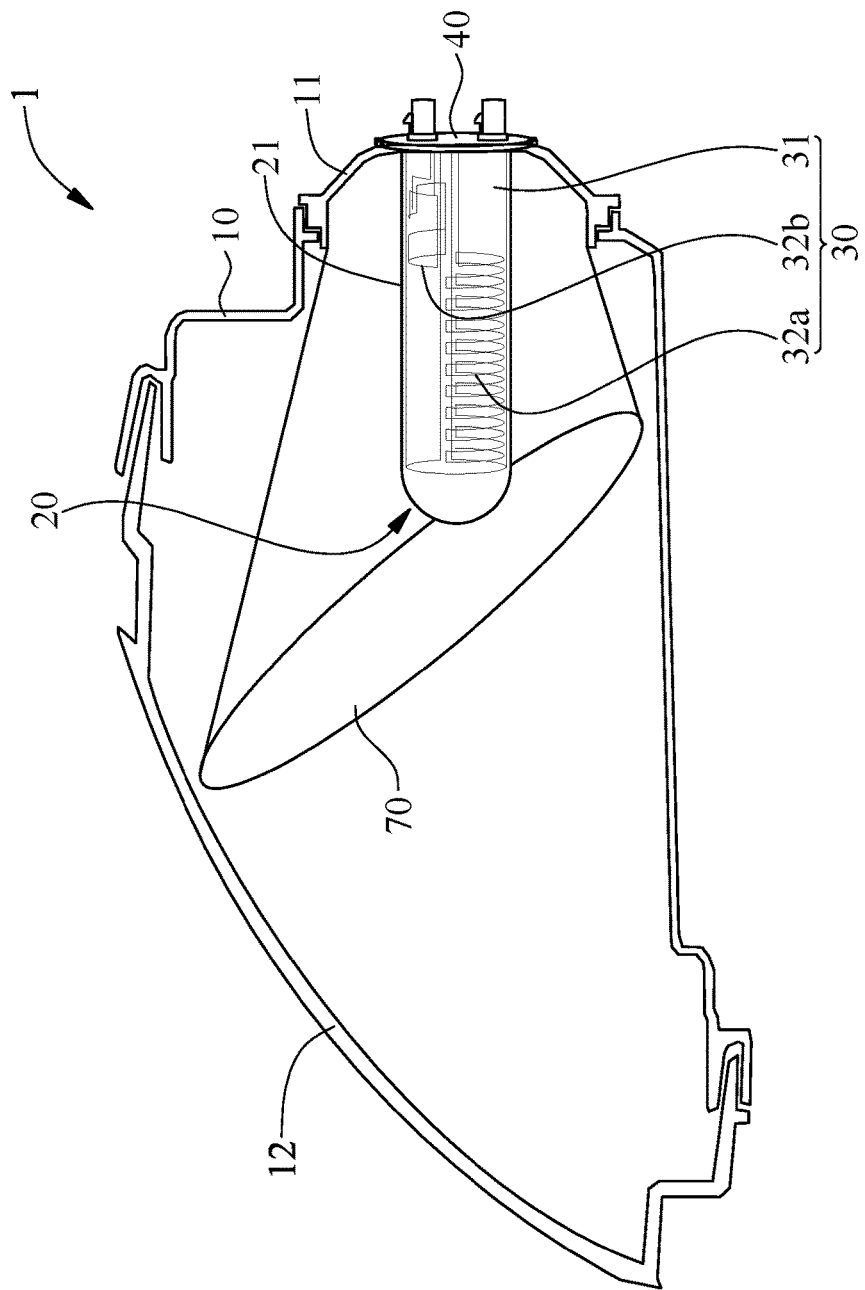
FIG. 1 is a schematic view of a headlight socket according to an embodiment of the present invention.
Figure 2:
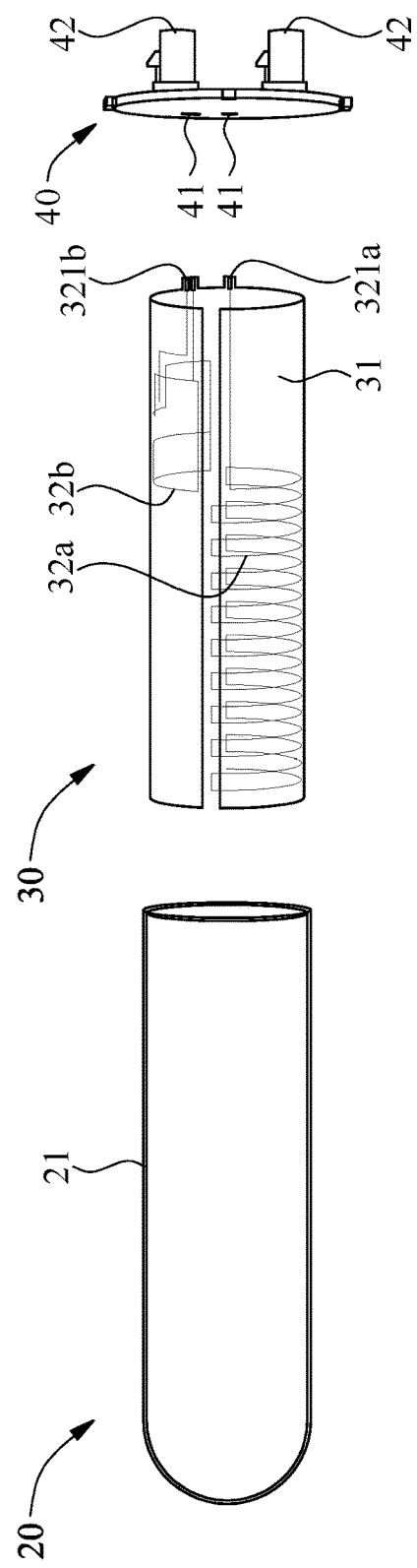
FIG. 2 is an exploded view of a cover, first antenna device and connection stand according to the embodiment of the present invention.
Figure 3:
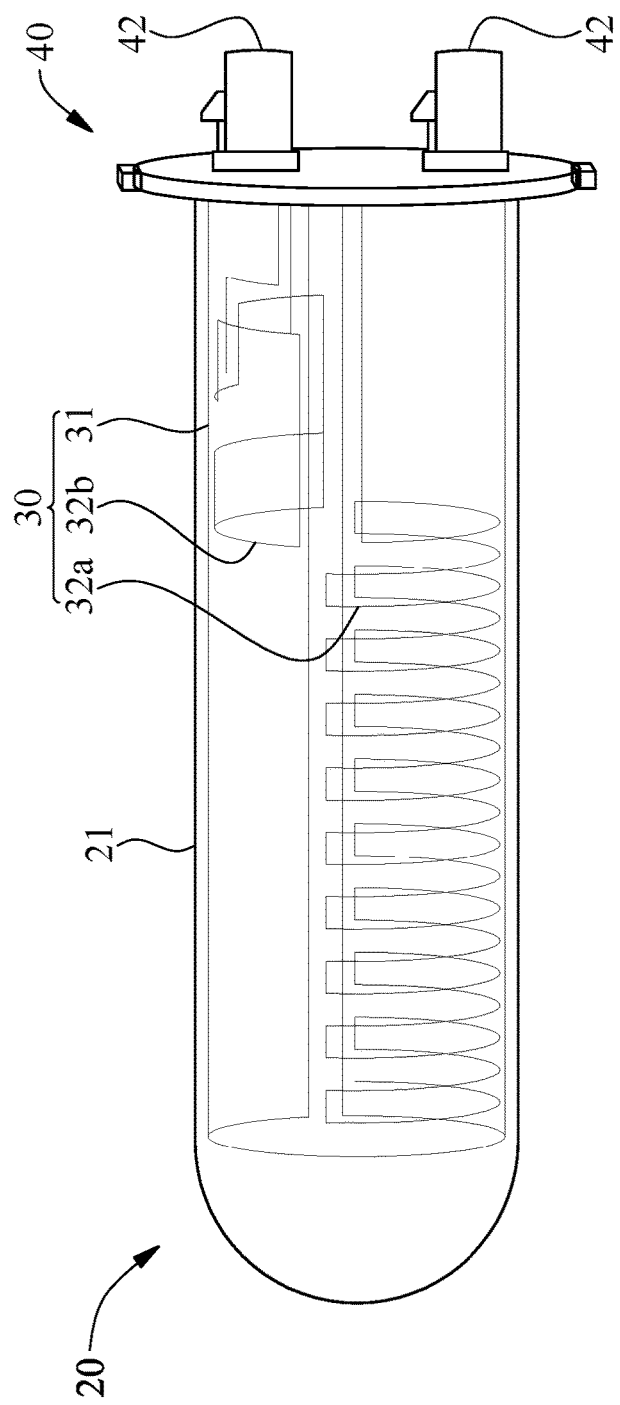
FIG. 3 is a schematic view of the cover, first antenna device and connection stand put together according to the embodiment of the present invention.

Referring to FIG. 1 through FIG. 3, a headlight socket 1 according to an embodiment of the present invention comprises a base 10, a cover 20, a first antenna device 30, and a connection stand 40.

The base 10 comprises a mounting portion 11. The cover 20 is mounted on the base 10 through the mounting portion 11. The cover 20 has a sidewall 21 that annularly defines a receiving space. The first antenna device 30 is received in the cover 20. The first antenna device 30 comprises a conductive end 321a. The connection stand 40 is coupled to the sidewall 21. The connection stand 40 comprises a connection port 41 in contact and connection with the conductive end 321a.

Referring to FIG. 2 and FIG. 3, in this embodiment, the cover 20 has a cylindrical receiving space and is closed at one end. The cover 20 is made of any appropriate material, such as glass or plastic, and is either transparent or opaque.

The first antenna device 30 is a flexible antenna module or a thin-film antenna module and winds to take on a cylindrical shape and be disposed in the cover 20. The first antenna device 30 comprises a flexible panel 31 and at least an antenna structure (provided in the form of two antenna structures 32a, 32b in this embodiment.) The flexible panel 31 is flexible and thus can wind to take on a cylindrical shape and get received in the cover 20. The perimeter of the flexible panel 31 thus wound substantially equals the perimeter of the sidewall 21 of the cover 20. The flexible panel 31 thus wound to take on a cylindrical shape abuts against the sidewall 21 of the cover 20 and thus gets supported by the cover 20 so as to reduce the chance that the first antenna device 30 will undergo displacement as a result of external vibration.

The antenna structures 32a, 32b of the first antenna device 30 are formed on the flexible panel 31 by electroplating and printing. The antenna structure 32a extends to the edge of the flexible panel 31 to form the conductive end 321a. The antenna structure 32b extends to the edge of the flexible panel 31 to form the conductive end 321b. The antenna structures 32a, 32b are made from copper or silver. The antenna structures 32a, 32b receive various conventional signals from vehicles, including AM/FM radio signals, digital TV signals and broadcast signals. For instance, the antenna structure 32a is a broadcast antenna, whereas the antenna structure 32b is a digital television (DTV) antenna or a global positioning system (GPS) antenna.

Figure 4:
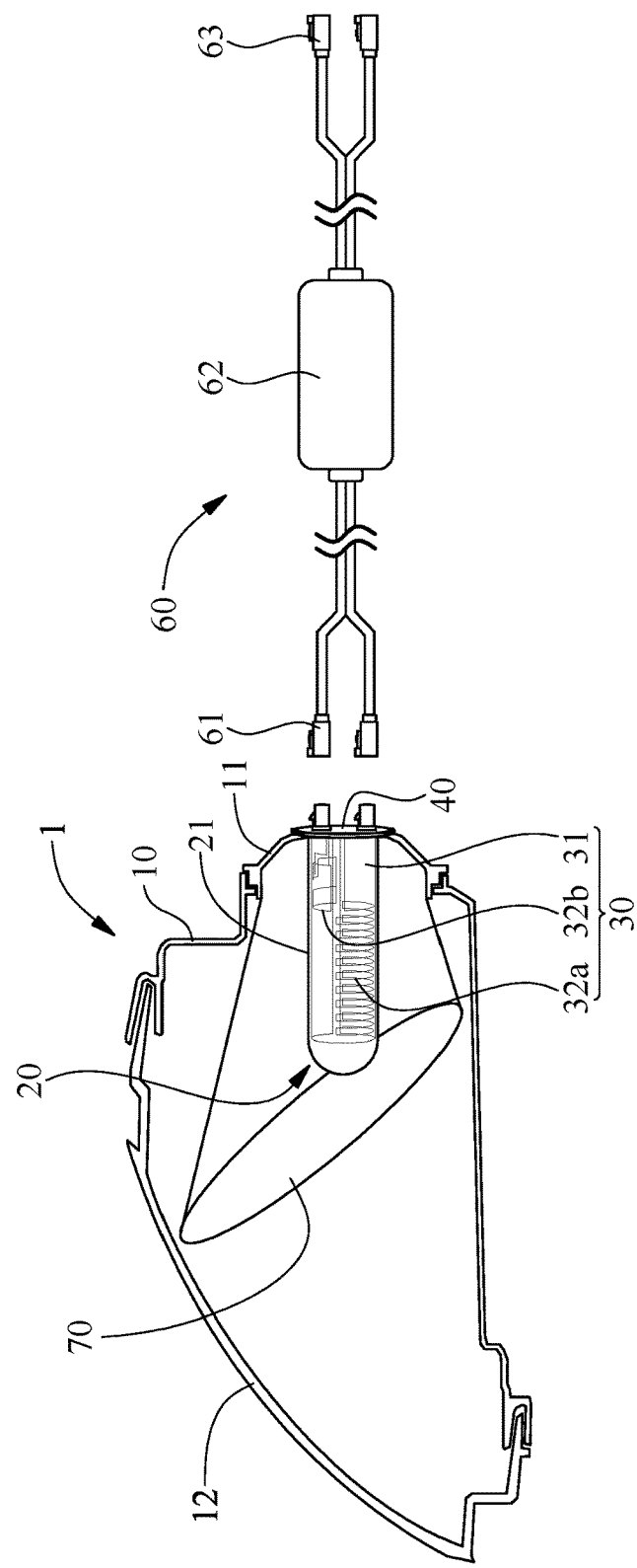
FIG. 4 is a schematic view of a headlight socket connected to a signal line according to the embodiment of the present invention.

Referring to FIG. 4, the base 10 is disposed at the front of a car and for use in mounting a headlight 70. The base 10 has a transparent lampshade 12 which light beams emitted from the headlight 70 penetrate. An opening is disposed at the mounting portion 11 of the base 10 so that the cover 20 is penetratingly fixed to the opening. Alternatively, the mounting portion 11 has an assembly structure which the connection stand 40 is coupled to. The mounting portion 11 has an engagement mechanism or a thread whereby the connection stand 40 is coupled to the mounting portion 11. The location of the mounting portion 11 on the base 10 is not restricted by the accompanying drawings.

Referring to FIG. 4, the connection stand 40 has a connection terminal 42 connectable to an adapter 61 of a signal line 60 to send signals received by the first antenna device 30. The signals received is processed with a power amplifier 62 of the signal line 60 and sent by an adapter 63 to a related host or functional module.

Figure 5:
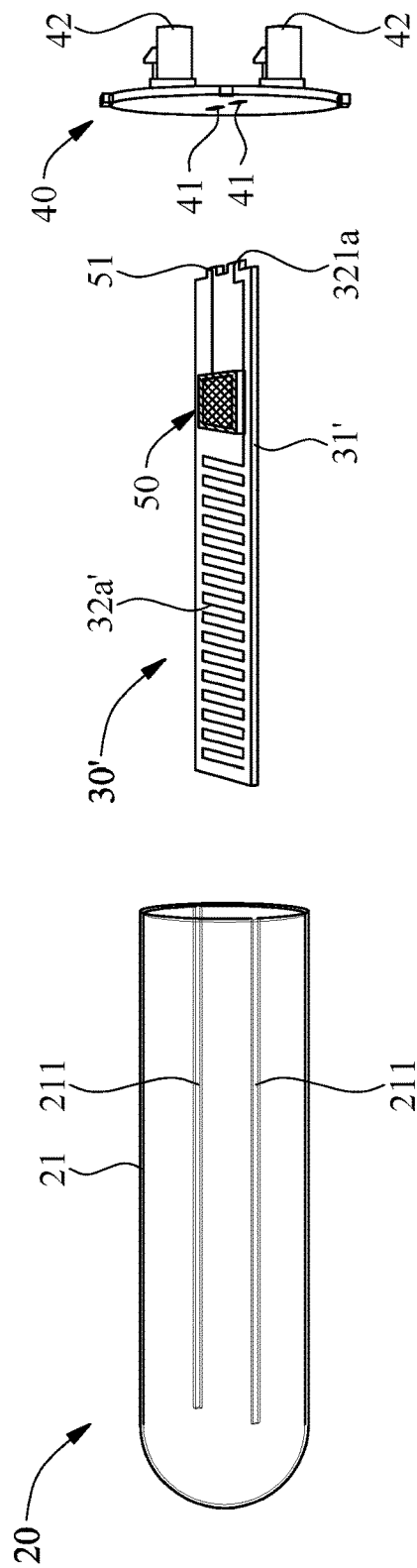
FIG. 5 is an exploded view of the cover, first antenna device and connection stand according to another embodiment of the present invention.
Figure 6:
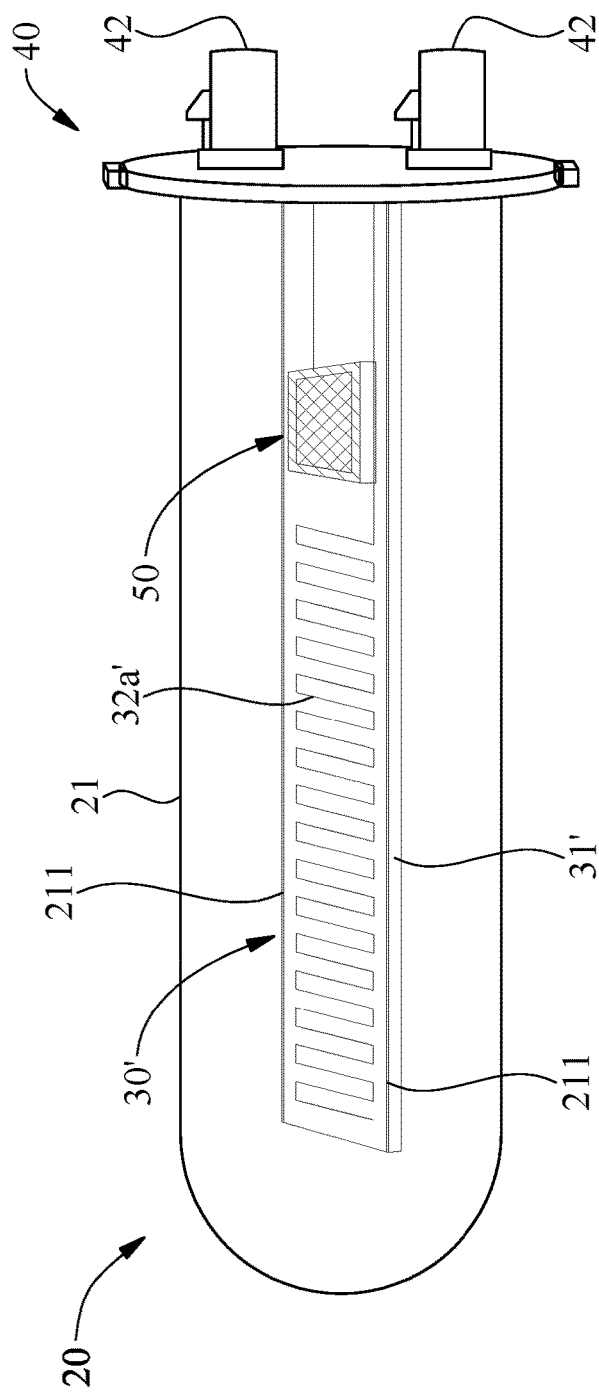
FIG. 6 is a schematic view of the cover, first antenna device and connection stand put together according to yet another embodiment of the present invention.

Referring to FIG. 5 and FIG. 6, there are shown schematic views of the first antenna device according to another embodiment of the present invention, respectively.

In this embodiment, the first antenna device 30' is a microstrip antenna module, a rigid antenna module, a ceramic antenna module or a patch antenna module. The first antenna device 30' comprises a rigid panel 31' and at least an antenna structure (exemplified by an antenna structure 32a' in this embodiment). A slot 211 is disposed on a sidewall 21 of the cover 20. The first antenna device 30' is inserted into the slot 211.

The antenna structure 32a' is a digital television (DTV) antenna, a global position system (GPS) antenna or a broadcast antenna.

This embodiment further comprises a second antenna device 50. The second antenna device 50 is disposed on the first antenna device 30' and has a conductive end 51. The conductive end 51 is connected to the connection port 41 on the connection stand 40. The second antenna device 50 is a microstrip antenna module, a rigid antenna module, a ceramic antenna module or a patch antenna module. Referring to FIG. 5 and FIG. 6, the first antenna device 30' is exemplified by a microstrip antenna module, whereas the second antenna device 50 is exemplified by a patch antenna module.

The second antenna device 50 comprises at least an antenna structure (not shown) exemplified by a digital television (DTV) antenna, a global position system (GPS) antenna or a broadcast antenna.

Therefore, according to the embodiments of the present invention, the headlight socket 1 is for use with a vehicle. With the first antenna devices 30, 30' and second antenna device 50 being disposed at the front of the vehicle, signals can best be received from the front of the vehicle while the vehicle is moving, thereby enhancing the quality of signal reception. The headlight socket 1 is advantageously characterized in that conventional vehicular antennas are integrated into a vehicle to manifest the advantages of modularization so that, during an automobile assembly process, an antenna assembly procedure and a headlight assembly procedure are integrated, and in consequence the automobile assembly process is simplified, allowing internal circuits to be readily integrated.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A headlight socket with an antenna, comprising:
a base disposed at a front of a vehicle and for use in mounting a headlight and, the base including a mounting portion;
a cover mounted on the base through the mounting portion and having a sidewall for annularly defining a receiving space;
a first antenna device received in the cover and including a conductive end; and
a connection stand coupled to the sidewall and including a connection port in contact and connection with the conductive end.

2. The headlight socket of claim 1, wherein the cover has a cylindrical receiving space, whereas the first antenna device is provided in form of one of a flexible antenna module and a thin-film antenna module and winding to take on a cylindrical shape and be disposed in the cover.

3. The headlight socket of claim 2, wherein the first antenna device comprises at least an antenna structure being at least one of a digital television (DTV) antenna, a global position system (GPS) antenna, and a broadcast antenna.

4. The headlight socket of claim 1, wherein a slot is disposed on the sidewall of the cover, whereas the first antenna device being one of a microstrip antenna module, a rigid antenna module, a ceramic antenna module, and a patch antenna module and inserted into the slot.

5. The headlight socket of claim 4, wherein the first antenna device comprises at least an antenna structure being at least one of a digital television (DTV) antenna, a global position system (GPS) antenna, and a broadcast antenna.

6. The headlight socket of claim 5, wherein further comprises a second antenna device disposed on the first antenna device, having a conductive end connectable to a connection port of the connection stand, and being one of a microstrip antenna module, a rigid antenna module, a ceramic antenna module, and a patch antenna module.

7. The headlight socket of claim 6, wherein the second antenna device comprises at least an antenna structure being at least one of a digital television (DTV) antenna, a global position system (GPS) antenna, and a broadcast antenna.

8. The headlight socket of claim 4, further comprising a second antenna device disposed on the first antenna device, having a conductive end connectable to a connection port of the connection stand, and being one of a microstrip antenna module, a rigid antenna module, a ceramic antenna module, and a patch antenna module.

9. The headlight socket of claim 8, wherein the second antenna device comprises at least an antenna structure being at least one of a digital television (DTV) antenna, a global position system (GPS) antenna, and a broadcast antenna.

\* \* \* \* \*